Dec. 14, 1965  J. K. STONE  3,223,521
METHODS FOR INCREASING THE PROPORTION OF SCRAP METAL
CHARGED TO BASIC OXYGEN CONVERSION PROCESSES
Filed Feb. 18, 1963
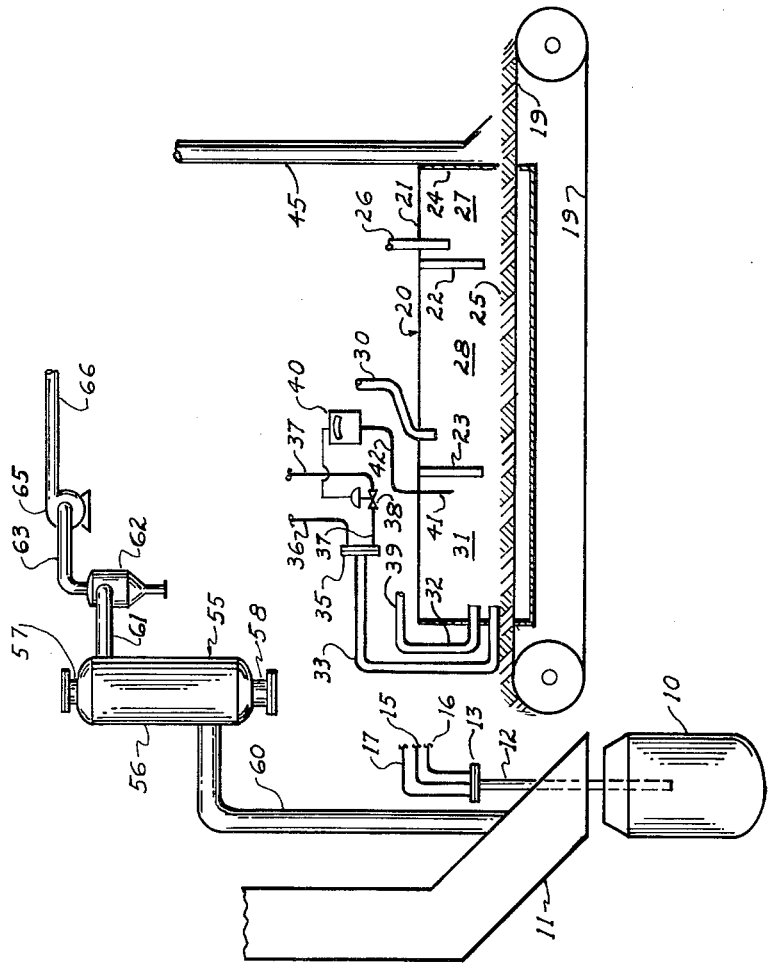
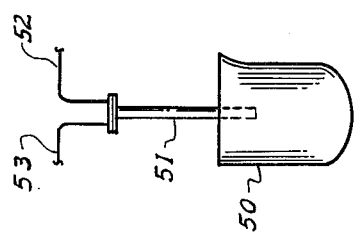
INVENTOR.
JOSEPH K. STONE
BY
ATTORNEY

3,223,521
METHODS FOR INCREASING THE PROPORTION OF SCRAP METAL CHARGED TO BASIC OXYGEN CONVERSION PROCESSES

Joseph K. Stone, Berkeley, Calif., assignor, by mesne assignments, to Kaiser Industries Corporation, Oakland, Calif., a corporation of Nevada
Filed Feb. 18, 1963, Ser. No. 259,138
5 Claims. (Cl. 75—43)

This invention relates to improvements in the basic oxygen steel making process and in apparatus useful in that process. Particularly, this invention relates to methods and means for utilizing increased proportions of scrap in the charge to such basic oxygen steel making processes.

The basic oxygen process for making steel is conducted by placing a suitable charge in a vessel or converter and then directing a stream of substantially pure oxygen against the surface of the charge to effect the conversion reactions. The major constituents of the charge include a hot metal which is usually molten pig iron of high carbon content, scrap metal and flux or slag-forming material. Generally, the hot metal must constitute at least 75%–80% of the ferrous charge because all of the heat necessary for melting scrap metal and the other ingredients must come from oxidation of the carbon, silicon and other impurities in the hot metal and its sensible heat.

The reactions involved in producing steel by the basic oxygen process are many and some are quite complex. Although the oxygen stream directed against the surface of the charge probably does not penetrate deeply beneath the surface, because of circulation an oxidizing effect does permeate the entire metal bath within the converter so that carbon, silicon and other impurities are converted to their oxides either by direct oxidation with the oxygen or by reduction of iron oxides that are formed by direct oxidation. Throughout the course of the conversion a constantly changing equilibrium is being approached which is established by the temperature of the converter and the nature and quantities of the reactants present at any given time, but the aggregate of all the reactions ultimately results in melting the scrap, mixing the melted scrap with the pig iron, reducing the carbon content of the resultant homogeneous melt to the desired amount, and eliminating impurities from the metal to form a molten steel phase.

The fluxing materials that are added to the charge to form slag include burnt lime, oxides of iron, bauxite, and fluorspar, and in the course of the conversion these materials, except iron oxides, become a liquid phase that is less dense than the molten metal phase. The slag phase dissolves nonmetallic portions of the charge, such as $SiO_2$ and phosphorous oxides and thereby removes them from the metal phase. Therefore, the impurities in the metal are removed either as gases, e.g., $CO_2$, CO, $SO_2$, or as solids or liquids that are soluble in slag, e.g., $SiO_2$ and phosphorous oxide.

It is frequently desirable to use greater proportions of scrap metal than the 20%–25% that can be melted and refined by oxidation of the normal oxidizable impurities in the hot metal charge. Increased scrap usage may be desirable when the price of scrap is low compared with the price of pig iron, or when steel production is desirably greater than the hot metal available in a given plant. It is an object of this invention to provide improved methods and means for increasing scrap usage.

It is known that the proportion of scrap in the charge can be increased if more heat is added to the converter, and in the past it has been proposed to add heat by various means. For example, it has been proposed to charge carbon in the form of coal or coke to the converter so that it will oxidize to contribute heat to the process. It has also been suggested to preheat scrap, particularly by contacting it with the hot gas evolved from the basic oxygen process thereby employing what would normally be wasted heat. However, many problems are encountered by such means of adding heat, such as contamination of the product, poor regulation of heat which affects the composition of the product, and expensive, cumbersome, and unreliable apparatus additions to a flue system that is necessarily already very expensive and cumbersome, because it must handle large volumes of hot and dust-laden gases that are evolved from the process. In normal operations such flue systems must be large enough to handle the great gas volumes produced, they must be water cooled to withstand the 3000° F. and hotter temperatures of the gas, and they must be adapted with induced draft fans and particle separators which must also be built and adapted to withstand the hot destructive environment.

When scrap iron is preheated in the usual manner, a layer of iron oxide forms on its surface. Normally, the scrap cannot be preheated hotter than 1500° F. because when the surface layer of iron oxide at temperatures above 1500° F. contacts carbon-containing molten metal, there is a violent, almost explosive reaction. It is an embodiment of this invention to preheat scrap metal to temperatures in excess of 1500° F. and in fact, to temperatures of 2000° F. and hotter, thereby adding a great deal of heat to the charge and increasing substantially the amount of scrap that may be charged, but without creating explosive reaction conditions when the scrap is contacted by hot metal. This embodiment is accomplished by burning a carbonaceous fuel to produce a hot combustion gas, controlling the composition of the hot combustion gas so that it is nonoxidizing, which may include being neutral or reducing, and raising the temperature of the scrap by contacting it with the resultant combustion gas. By such control large amounts of iron oxide will not form on the scrap surface, and it can be heated to 1500° F. and, in fact, to 2000° F. and hotter without producing violent reactions when contacted with hot metal.

This embodiment of the invention is accomplished by carefully controlling the composition of the combustion gas to produce a heating medium, that is, the gases in contact with the scrap metal, at least in the final stages of heating, so that less than about 1% by volume of available oxygen is present in that heating medium. The heating may be a single stage heating employing a carbonaceous fuel, such as hydrogen gas, oil, coal, etc., which is burned with insufficient oxygen or air or burned with sufficient oxygen and subsequently diluted with a nonoxidizing or a reducing gas to provide the desired gas composition. By employing such a heating medium, scrap may be preheated to 2000° F. or more without creating undesirable processing characteristics.

The preheating of scrap metal may be accomplished in two or more stages and in one or in a plurality of heating zones. The scrap charge may be preheated to temperatures of 2000° F. or more by contacting it with combustion gas of any composition, but in the final stage of heating before charging the scrap to a converter, the composition of the heating medium is controlled as stated above to bring the hot scrap into equilibrium with a relatively reducing gas, that is, one having 1% by volume or less available oxygen. The scrap may pass through a vessel as a downwardly moving column, or on a conveyor through various heating zones which may include any or all of a preheat zone in which the temperature is raised rapidly without control of the composition of the heating medium, a soaking zone in which the desired temperature is maintained long enough for all portions of the irregularly sized, shaped and constituted scrap pieces to reach the desired temperature, and a final preparation zone in which the oxide content of the scrap is adjusted by contacting it with a reducing or neutral gas for sufficient time for equilibrium to be substantially reached.

The composition of the final heating medium, as hereinbefore stated, is regulated to contain less than about 1% by volume of available oxygen. The composition may be regulated in any suitable manner. Regulation may be accomplished by employing insufficient oxygen to support combustion of all of the fuel employed so that the heating medium which contacts the scrap metal will contain large quantities of carbon monoxide, hydrocarbon and partly oxidized hydrocarbon. The composition may be regulated by blending a reducing gas or a neutral gas to dilute the heating medium. Nitrogen is an example of a neutral gas while methane and carbon monoxide, especially the carbon monoxide evolved from the basic oxygen steel making process, may be employed as reducing gases.

The heating medium composition may be regulated manually or automatically. For example, a continuous analyzer may be employed to sense the composition of the heating gas with respect to its oxygen content and to regulate the oxygen content by regulating the oxygen supply for combustion or the amount of diluent added, such regulating being responsive to the available oxygen sensed in the gas in contact with the scrap. By preheating the scrap to temperatures of at least 1500° F. and even to 2000° F. or more, substantial amounts of heat are added to the conversion zone which permit an additional 10% of the charge or more to be scrap metal. Sufficient fuel should be oxidized to raise the temperature of the scrap to at least 1500° F. within an hour to provide preheated scrap for successive heats in a converter, which successive heats occur approximately one hour apart.

In another embodiment of this invention the proportion of scrap metal that may be charged to the basic oxygen steel process may be increased by preheating or superheating the hot metal or molten pig portion of the charge. It is desirable to add heat to the process by superheating the molten metal for several reasons. One reason is that superheating the hot metal portion of the charge does not create handling problems. The hot metal is already molten and very hot and equipment necessary to handle such material is already in use. Adding heat to the hot metal changes neither its physical nor chemical characteristics so that the equipment and subsequent manipulative steps of the process need not be altered to accommodate the higher temperature of the hot metal. Another advantage of superheating the hot metal is that the hot metal is the largest portion of the charge and raising its temperature adds significant amounts of heat to the process. However, it is difficult to add heat to a material that is already approximately 2400° F. or hotter which is contained in a thickly insulated vessel.

It is an embodiment of this invention to preheat the molten or hot metal charge to the converter by blowing a combustible mixture of carbonaceous fuel and substantially pure oxygen downwardly against the surface of said hot metal charge whereby the temperature of the molten metal is raised substantially without the need to transfer heat through the container walls. The oxygen and fuel may be discharged against the surface of the molten metal through a lance such as is used in the conversion of metal in the basic oxygen process and the superheating of the hot metal may be accomplished in the conversion vessel, or preferably in a holding or transfer vessel before the hot metal is charged to the conversion vessel. The lance employed may be of conventional design but modified so that fuel can be introduced into the oxygen stream either before it discharges from the nozzle or mixed with the oxygen as it discharges from the nozzle. Direct heating of the hot metal with oxygen and carbonaceous fuel can increase its temperature from the normal 2300° F. to 2500° F. to a temperature of 2600° F. or more thereby adding substantial amounts of heat to the process and permitting an additional 4% of the charge or more to be scrap metal. The hot metal may also be heated by an electric arc, as when electrodes are placed to arc near the surface of the hot metal in a holding vessel. As stated above, adding heat even in large quantities to the hot metal portion of the charge does not change its physical or chemical characteristics and no changes in the process other than increasing scrap usage need be made when employing this embodiment. Since the high carbon content of the hot metal is necessary in effecting subsequent conversion reactions, the hot gas employed to superheat the hot metal should be monoxidizing. By using insufficient oxygen, the hot gas emitted from the lance can be controlled to be neutral, reducing or even carburizing in nature.

For reasons discussed above, the preheating of hot metal should be accomplished in one hour or less.

In another embodiment this invention involves preheating and preconditioning flux or slag-forming material by employing the gas evolved from a basic oxygen conversion process as a preheating and preconditioning medium. Unlike scrap, the lime, fluorspar and bauxite employed as fluxing materials are obtained and used in the form of relatively small pieces of uniform size. During transportation and storage flux becomes wet, contaminated with dirt, and the lime is hydrated to some extent to form powdery calcium hydroxide which blows from the conversion vessel without entering the flux phase and loads the dust handling facilities of the flue system. In accordance with this embodiment of the invention the hot gas evolved from the basic oxygen conversion process, which is 3000° F. or hotter, is employed to preheat the flux by passing it upwardly through a bed of flux maintained in a suitable vessel. In this embodiment the flux particles are maintained as a fluidized bed in the vessel so that they are heated uniformly to high temperature. In addition to being heated, moisture is driven off and small dirt particles and powdery calcium hydroxide particles are either calcined to lime or blown from the bed and thereby removed from the flux material.

The gas stream is withdrawn directly from the flue assembly of the oxygen conversion process and passed directly into the lower portion of the flux preconditioning vessel which is maintained on the suction side of a suitable fan. The converter gas passing through the bed of particles is cooled substantially and the iron dust with which it is laden is removed to a great extent by fusing or coalescing with the flux particles and thereby it is returned to the process in the next blow with a corresponding increase in metallic yield. If desired, and in a preferred embodiment, a particle separator is employed between the pretreating vessel and the suction side of the fan so that particles of dirt, calcium hydroxide, and iron dust which are blown from or which pass through the bed, are removed from the gas stream before it is passed through the fan and discharged. The gas passing through the fan is substantially cooler than gas entering the flux preconditioning vessel and, therefore, it is more readily handled by the fan equipment.

The accompanying drawing is a schematic representation illustrating the various embodiments of the present invention which may be employed singly or in combination and which are shown herein to be illustrative of the invention rather than limiting on its scope.

A converted 10, which is a large refractory-lined open-mouthed vessel, is charged with the various ingredients required to produce steel. The converter 10 is positioned beneath a hood assembly 11 that is only partly shown.

The hood assembly generally is a double-walled, water-cooled flue system that includes, besides the gathering and transporting portions shown, means for cooling gases, separating dust and particles from them, and means for conveying the gases to a stack. A lance 12 which is generally a conduit consisting of three concentric pipes and fitted with means 13 so that oxygen may be admitted through line 15 while lines 16 and 17 are provided to introduce and remove cooling water employed to maintain the lance cooled during the conversion, is positioned to discharge oxygen against the surface of the charge in converter 10. The converter 10, flue assembly 11 and lance 12 are all conventional.

The scrap preheating assembly generally designated as 20 is shown as a horizontal furnace 21 through which a conveyor belt 19 is passed. The furnace 21 is divided into three zones by baffles 22 and 23 beneath which the scrap 25 passes while on the conveyor. A nozzle 26 is employed to introduce burning fuel into the chamber 27 formed between the end wall of the furnace 21 and the baffle 22. It is contemplated that the line 26 will carry large volumes of combustible fuel mixture into the chamber 27 so that the scrap 25 within that chamber 27 is heated quickly to a high temperature. Scrap metal is obtained in many forms. Some scrap metal is turnings or shavings from machines with very small dimensions and low bulk density, while other scrap metal such as scrap ingots and bloom butts consist of massive pieces of metal. It is therefore desirable to provide a scrap preheating furnace with a soaking chamber which maintains high temperatures for a period long enough for all portions of all pieces of scrap metal to reach the temperature of the surroundings. Between baffle 22 and baffle 23 such a soaking chamber 28 is formed. The line 30 is employed to introduce combustible fuel and air mixtures into the chamber 28 so that the desired temperature may be maintained in it. Finally, the furnace 21 includes a final composition adjusting chamber 31 formed between the end wall 32 and the baffle 23. In this chamber the composition of the heating gas is regulated to contain 1% by volume or less of available oxygen. The line 33 is fitted with means 35 to introduce both air and fuel into the line 33. Fuel such as methane is introduced through line 36 and air necessary to support combustion is introduced through line 37 and valve 38 which is controlled by controller 40. A sensing means 41 transmits samples of the atmosphere in chamber 31 through line 42 to the controller 40 which, in this embodiment, must include a continuous analyzer that is sensitive to available oxygen so that when the available oxygen in chamber 31 becomes greater than 1% by volume, controller 40 causes valve 38 to close partially so that the air-fuel mixture in line 33 contains less air and the combustion of the fuel results in introducing a more reducing atmosphere into the chamber 31.

The composition in chamber 31 may also be regulated by introducing through line 39 a nonoxidizing or reducing gas to dilute the combustion gas entering through line 33. The flow of gas through line 39, such as methane, carbon monoxide, nitrogen, etc., may also be regulated by controller 40.

The scrap metal issuing from chamber 31 is at high temperature and its oxide content controlled so that it may be charged to the conversion vessel and contacted with molten high-carbon pig iron without creating violent and explosive reactions. It is also contemplated that a flue means 45 may be employed in wall 24 to remove all of the combustion gases from the furnace 21. The stack 45 which may be provided with a suitable blower causes the flow of combustion gas to be from the chamber 31 toward the chamber 27. By this means the controlled composition of the gas in the chamber 31 is not changed by gases carried in from chambers 28 or 27, and the partially burned gases in chamber 31 may, if sufficient oxygen is present, be further oxidized in chambers 28 and 27 so that chemical heat still available in those gases may be recovered. It is to be understood that the illustrated embodiment is but one of many embodiments that may be employed within the scope of this invention. The scrap preheater may be a single zone as a vertical vessel filled with scrap and it may be subjected to heating first with fully oxidized gas and subsequently with partially oxidized gas having controlled oxygen content or the scrap may be heated entirely with gas having controlled available oxygen content.

In another embodiment of this invention the hot metal or molten iron while in a conventional holding or conveying vessel such as ladle 50 may be treated by having a stream of carbonaceous fuel and substantially pure oxygen directed to impinge against its surface. A lance 51 may be especially adapted for this purpose by introducing into it substantially pure oxygen through line 52 and a carbonaceous fuel such as natural gas or oil through line 53. The superheating of molten metal desirably is carried on in a holding vessel during the period that a conversion is being effected in the vessel 10. Thus, when the heat in converter 10 is completed, the converter 10 may be emptied, and the hot metal in the ladle 50 will be ready to charge containing substantial superheat which will permit greater quantities of scrap in the charge. The composition of the heating gas discharging from lance 51 should be carefully controlled to be nonoxidizing to prevent consuming oxidizable elements in the hot metal that are required for the subsequent conversion. By providing a sufficient excess of fuel through line 53, the hot metal can be heated with a gas that is nonoxidizing or even carburizing, the latter condition being particularly desirable because it improves the capacity of the hot metal to produce heat in the subsequent conversion process.

In another embodiment of this invention a flux heating assembly generally designated 55 is employed to preheat, clean, dehydrate and generally condition fluxing materials for use in the basic oxygen conversion process. A container shown as vessel 56 is fitted with a suitable top opening 57 for charging flux materials and a suitable bottom opening 58 for discharging flux materials to the vessel 56. Conventional chutes or conveyors, not shown, conduct flux from vessel 56 to converter 10.

A line 60 leads from within the vent assembly 11 to the lower portion of the vessel 56 and it is provided for carrying hot converter gases from the flue assembly 11. To adapt line 60 for this purpose it may be necessary to insulate its interior with refractory material or to provide water cooling or other conventional methods that are known in the art for protecting metal conduits.

A line 61 leads from the upper portion of vessel 56 to a particle separator 62 that may be employed to remove dirt, calcium hydroxide, flux particles that are too small, iron dust that passes through the vessel 56 and other solid materials entrained in the gas stream. A line 63 connects particle separator 62 to the suction side of fan 65 which discharges to line 66 leading to a stack.

The flux maintained within the vessel 56, while conversion is effected in converter 10 and while blower 65 is in operation, is maintained as a fluidized bed of particles in contact with and completely surrounded by a flowing stream of hot, iron dust-laden gas which is at a temperature in the range of up to 3000° F. or hotter and which consists substantially of carbon monoxide and carbon dioxide. The upwardly flowing gas stream is dry and reducing in character and has no detrimental effect on the chemical or physical characteristics of the fluxing material. However, as heretofore stated, the gas will carry lighter and smaller particles from the fluxing material by physical entrainment and it will, at the high temperatures involved, cause the ferrous dust to fuse with the larger particles of fluxing material and to be returned to the process rather than lost when the fluxing materials are charged to the subsequent heat in converter 10. The high temperature also will cause calcium hydroxide, formed by hydrating lime, to be calcined back to lime. By raising the temperature of the flux material to 2000° F. or higher, the scrap charge to a basic oxygen converter can be increased by about an additional 4% of the charge.

What is claimed is:

1. A method of preheating scrap metal for use in a basic oxygen conversion process which comprises
   (A) enclosing the scrap in a preheat zone,
   (B) burning carbonaceous fuel,
   (C) passing the resultant combustion gas into contact with said scrap,
   (D) terminating the preheating by contacting the scrap with combustion gas having its composition regulated to contain less than 1% by volume of available oxygen for a period of time sufficient to bring said scrap substantially into equilibrium with said gas, and
   (E) regulating the total amount of fuel burned to provide enough hot combustion gas to raise the temperature of the scrap at least to 1500° F.

2. A method for increasing the proportion of scrap metal in the charge to a basic oxygen conversion process which comprises placing the hot metal portion of the charge in a holding vessel, positioning a lance over the surface of said metal, and providing a combustible mixture of substantially pure oxygen and sufficient carbonaceous fuel to produce a nonoxidizing combustion gas which discharges against the surface of said hot metal, continuing said discharge until said hot metal is at least 2600° F. and subsequently charging said hot metal to a basic oxygen converter.

3. A process of claim 2 further characterized in that sufficient carbonaceous fuel and oxygen are employed to raise the temperature of said hot metal to at least 100° F. within the period of 1 hour.

4. The process of claim 2 further characterized in that said combustible mixture contains enough carbonaceous fuel to produce, upon combustion, a carburizing gas.

5. A method for increasing the proportion of scrap metal in the charge to a basic oxygen conversion process which comprises introducing the flux employed in said basic oxygen conversion process into a confined preconditioning vessel, passing gas from the flue system of said basic oxygen conversion process into the bottom of said preconditioning vessel, withdrawing said gas from the top of said preconditioning vessel whereby a fluidized bed of flux is maintained, continuing to contact said flux with said gas until said flux is at least 1500° F., and subsequently charging the resultant preconditioned flux to said basic oxygen converter.

References Cited by the Examiner
UNITED STATES PATENTS

| | | | |
|---|---|---|---|
| 794,212 | 7/1905 | Benjamin | 75—60 |
| 1,617,726 | 2/1927 | Speller | 75—60 |
| 2,480,901 | 9/1949 | Bowden et al. | 75—53 |
| 2,802,731 | 8/1957 | Heimberg | 75—43 |
| 2,803,533 | 8/1957 | Bieniosek et al. | 75—53 |
| 2,804,295 | 8/1957 | Brooke | 75—43 |
| 2,805,143 | 9/1957 | Davies | 75—43 |
| 2,886,304 | 5/1959 | Guthrie | 75—46 |
| 2,939,782 | 6/1960 | Madaras | 75—43 |

DAVID L. RECK, *Primary Examiner.*

UNITED STATES PATENT OFFICE
CERTIFICATE OF CORRECTION

Patent No. 3,223,521                      December 14, 1965

Joseph K. Stone

It is hereby certified that error appears in the above numbered patent requiring correction and that the said Letters Patent should read as corrected below.

Column 2, line 18, for "destrucive" read -- destructive --; line 50, for "hydrogen" read -- hydrocarbon --; column 4, line 19, for "monoxidizing" read -- nonoxidizing --; line 72, for "converted" read -- converter --; column 5, line 22, for "of combustible" read -- of a combustible --.

Signed and sealed this 1st day of August 1967.

(SEAL)
Attest:

EDWARD M. FLETCHER, JR.
Attesting Officer

EDWARD J. BRENNER
                                           Commissioner of Patent